UNITED STATES PATENT OFFICE.

ALBERT B. HALL, OF COVINGTON, KENTUCKY.

SURGICAL DRESSING.

SPECIFICATION forming part of Letters Patent No. 372,142, dated October 25, 1887.

Application filed March 15, 1887. Serial No. 231,046. (No specimens.)

*To all whom it may concern:*

Be it known that I, ALBERT B. HALL, of Covington, in the county of Kenton and State of Kentucky, have invented certain new and useful Improvements in Surgical Dressings; and I do hereby declare the following to be a full, clear, and exact description of the invention, such as will enable others skilled in the art to which it pertains to make and use it.

My invention relates to an improvement in surgical dressings; and it consists in a composition of wool and cotton intimately mixed together in any suitable proportions, as will be more fully described hereinafter.

In preparing my dressing I preferably take two parts of the wool and three parts of cotton, by weight, and mix them intimately together; but I do not confine myself to these particular proportions, for these two substances may be mixed together in any suitable proportions that may be desired. The grease and other impurities are removed from the wool and cotton, thus rendering the dressing absorbent, either before or after they are mixed together.

The dressing may be rendered antiseptic by treatment with suitable chemicals.

A dressing composed of wool and cotton possesses great advantages over the ordinary dressings heretofore used. Where cotton is used as a dressing it becomes condensed and hard, either after having been used a short time or wet, and is objectionable for this reason. By mixing the cotton with wool, which does not possess the property of condensing or becoming hard, the cotton is prevented from becoming condensed. By combining both cotton and wool together to form a dressing for surgical use and for the treatment of various diseases I produce a dressing which possesses the valuable absorbent qualities of the cotton and the soft and non-condensing qualities of the wool.

Having thus described my invention, I claim—

A surgical dressing consisting of cotton and wool which is cleansed of its oil, so as to render it absorbent, and which are mixed together in suitable proportions, substantially as described.

In testimony whereof I affix my signature in presence of two witnesses.

ALBERT B. HALL.

Witnesses:
SALLA C. HUBBS,
M. H. HALL.